Patented Apr. 26, 1932

1,855,190

UNITED STATES PATENT OFFICE

LUDWIG KERN, OF WEBSTER GROVES, MISSOURI

PROCESS OF MAKING PHOSPHATE SILICATE FERTILIZER

No Drawing. Application filed October 31, 1925, Serial No. 66,071. Renewed July 15, 1930.

The present invention relates to the economical manufacture of a fertilizer containing the phosphoric acid radical and the silicic acid radical, both in a form available for assimilation by plants. The fertilizer prepared contains preferably a calcium silicate which is readily attackable by soil moisture, and is especially beneficial for "sour" soils.

Heretofore the phosphoric acid radical has been largely supplied to the soil in the form of superphosphate, this material being generally prepared by first finely grinding the phosphate rock or mineral phosphate, and then treating the same with sulphuric acid of relatively high concentration (say about 60° Bé.). This necessitated first an extremely fine grinding of the mineral phosphate (to a flour-like fineness). The mineral is hard and difficult to grind, and the fine grinding operation obviously requires the use of an excessive amount of power. Further, sulphuric acid used is more or less expensive. The use of superphosphate is still further objectionable in that it leaves the soil in a somewhat acid condition, thereby impairing instead of benefiting soils having a "sour" or property or tendency.

In accordance with the present invention, I crush the phosphate rock to relatively small pieces, although it is not necessary to crush to the form of a powder. The phosphate rock can readily be used in a form containing pieces of phosphate rock of some size. It is advisable, however, to crush the phosphate rock so that the largest pieces will be about the size of kernels of corn or peas, since the reaction described below will be found to be more complete.

Having crushed the phosphate rock to the degree indicated, I add say about an equal weight of thoroughly burned lime, preferably freshly burned, in a crushed condition, say in pieces of about the same fineness as that above indicated for the phosphate rock. To this mixture I then add diatomaceous earth or kieselguhr, which is desirably used in an amount between three times and six times the weight of the phosphate rock. This may be in the wet or damp form, as dug up out of the pit, and containing 50-80% of water. For ordinary purposes I find that a mixture of one part of the phospate rock, about one part of quick lime and five to six parts of diatomaceous earth will be satisfactory. In some cases I increase the lime above this proportion. The water from the diatomaceous earth gradually combines with the lime, to slake the lime. The slaked lime then reacts chemically with the silicic acid of the diatomaceous earth and with the phosphate rock, to form a phosphate silicate which is of a basic character, but is entirely different from the calcium silicate of Portland cement, in that it is readily attackable by soil moisture and soil acids, and is readily capable of neutralizing the latter. During this treatment it is not necessary to apply external heat to the reacting materials. The pile of material can be shoveled over or tumbled if desired.

In some cases, the mixture can be subjected to a slow treatment with additional water, for example, by being sprayed lightly with water, at intervals, say, of a few hours, sufficient water being used in several sprayings, (say a dozen sprayings) to complete the hydration of the lime. It is advisable to perform this operation rather slowly, the entire operation of hydrating the lime preferably occupying several days or a week or even two weeks.

In many cases, particularly when a diatomaceous earth containing well over 75% of water is employed, enough water is furnished by such diatomaceous earth and it is not necessary to add any further amounts of water.

Certain reactions of a more or less complicated character go on, and the phosphate salts are largely converted into an available condition, while a considerable proportion of the silicic acid of the diatomaceous earth remains in an available condition. The product in general may be termed a complex calcium phosphate silicate, although it is to be understood that the constituents may not be, or may be only partially, in actual chemical combination. Similarly, the calcium, or the phosphate, or the silicate may be present in excess of the amount required for chemical combination.

The total amount of water should not be sufficient to form a pasty or muddy mass, but the product should remain at the end of this treatment as a substantially dry-appearing pulverulent mass.

The material can now be sifted and any coarse lumps which remain can readily be broken up by being run through a light crusher. Such lumps will be found to crush easily, due to the disintegrating action of the lime and silicic acid thereupon.

Heretofore, agriculturalists have considered three principal elements or substances in valuing fertilizers, namely phosphoric acid, potash and nitrogen. According to my researches, available calcium silicate containing only a small amount of phosphorus is of just as much importance in plant growth as any of the three above stated.

In the preparation of the fertilizer according to the present case, potash salts or potash compounds can be added at any desired stage of the operation, either in the original mixture, or before the slaking of the lime, or after the slaking of the lime, or after the final sifting operation. Preferably, however, the potash salts will be added either before or just after the slaking operation or during this operation.

I can also add other fertilizing materials, preferably after the slaking operation.

The phosphate rock can be "high grade" (so called) containing say 80% tricalcium phosphate (so called "bone phosphate of lime" and commonly referred to in the trade as "B. P. L."), although a much lower grade rock containing 45 to 60% "B. P. L." can be used. This lower grade rock can be had at a low cost in many localities, since under prior practice it was useful practically only for making the phosphoric acid for double superphosphate. When the fertilizer does not have to be hauled long distances, I accordingly prefer this lower grade phosphate rock.

The reactions which take place between the lime, phosphate rock, and kieselguhr, are apparently quite complicated, and I do not attempt to give any complete scientific explanation thereof.

Phosphoric acid in commercial fertilizers now on the market is generally in one of three forms, namely, the "water soluble" phosphoric acid, which is of course readily available as plant food, second, the "citrate soluble" phosphoric acid, which is considered to be nearly as good as the water soluble, and "citrate insoluble", which is usually considered as being only of very little value for plant growth, since it requires a very long period for the citrate insoluble phosphoric acid to be absorbed by the plant life. In the processes of the present case, the product is useful as a plant food, although the phosphoric acid is not largely in the citrate soluble condition.

The process uses as the starting material natural phosphate rock containing its phosphoric acid in the citrate insoluble condition.

If the product is to be used on soils which are naturally acid (sour) it is advisable to employ substantially more lime than above referred to, say an amount equal to double the weight of the phosphate rock, or even more.

In some cases, in place of the diatomaceous earth, I can use other porous hydrated silicates, especially clays containing a substantial amount of hydrated colloidal silicic acid.

It will be noted that at no stage of the process do I apply any extraneous heating to the mass of material. The reaction of the water on the lime (slaking of the lime) generates some heat but the temperature of the mass does not go up to anything approaching a red heat, due to the continued presence of water in the mass, the evaporation of which water of course carries away the generated heat. The process is thus sharply distinguished from processes in which phosphate rock, silica, etc., are heated to a red heat or above.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. A process which comprises mixing finely divided phosphate rock with quick-lime and with material containing hydrated silicic acid, and thereafter adding water during a protracted period to slake the lime.

2. A process which comprises mixing finely divided phosphate rock with quick-lime and with diatomaceous earth and thereafter adding water during a protracted period to slake the lime.

3. A process which comprises mixing crushed phosphate rock with about an equal amount of quick lime, and with more than its weight of diatomaceous earth containing hydrated silicic acid, gradually adding water to slake the lime and to induce reaction between the components of the mixture.

4. The process of making a fertilizer which comprises forming a mixture of comminuted phosphate rock, comminuted burned lime and a hydrated silicic acid-containing material, and slaking said lime to effect a reaction between said lime, phosphate rock, and silicic acid material.

5. The process of making a fertilizer which comprises forming a mixture of comminuted phosphate rock, comminuted burned lime, and a hydrated silicic acid-containing material, whereby the water contained in said silicic acid material slakes said lime and a reaction between said phosphate rock, lime, and silicic acid material is obtained.

6. The process of making a fertilizer which comprises forming a mixture of comminuted phosphate rock, comminuted burned lime, hydrated silicic acid containing material, and a potash containing material, and slaking said lime to effect a reaction between said lime, phosphate rock, and silicic acid material.

In testimony whereof I affix my signature.

LUDWIG KERN.